United States Patent
Bullinger et al.

(10) Patent No.: US 7,029,032 B2
(45) Date of Patent: Apr. 18, 2006

(54) METHOD FOR ACTUATING A REVERSIBLE BELT PRETENSIONER

(75) Inventors: Wilfried Bullinger, Korntal-Muenchingen (DE); Walter Eberle, Hochdorf (DE)

(73) Assignee: DaimlerChrysler AG, Stuttgart (DE)

( * ) Notice: Subject to any disclaimer, the term of this patent is extended or adjusted under 35 U.S.C. 154(b) by 299 days.

(21) Appl. No.: 10/433,897

(22) PCT Filed: Dec. 6, 2001

(86) PCT No.: PCT/EP01/14327

§ 371 (c)(1),
(2), (4) Date: Jun. 6, 2003

(87) PCT Pub. No.: WO02/46005

PCT Pub. Date: Jun. 13, 2002

(65) Prior Publication Data

US 2004/0056471 A1    Mar. 25, 2004

(30) Foreign Application Priority Data

Dec. 8, 2000   (DE) .............................. 100 61 040

(51) Int. Cl.
*B60R 22/34* (2006.01)
(52) U.S. Cl. ........................ 280/806; 280/807; 180/268
(58) Field of Classification Search ............... 180/268; 280/806, 807; 297/480; 242/382–384.7
See application file for complete search history.

(56) References Cited

U.S. PATENT DOCUMENTS

| 3,534,190 | A | * | 10/1970 | Linblad | ................ | 200/61.58 R |
| 4,257,626 | A | * | 3/1981 | Adomeit | ..................... | 280/806 |
| 5,538,284 | A | * | 7/1996 | Nishide et al. | ............. | 280/806 |

(Continued)

FOREIGN PATENT DOCUMENTS

DE     19537226    6/1997

(Continued)

OTHER PUBLICATIONS

U.S. Appl. No. 10/433,896, filed Jun. 6, 2003, Method for Actuating a Reversible Belt Pretensioner, Wilfried Bullinger, et al.

(Continued)

*Primary Examiner*—Paul N. Dickson
*Assistant Examiner*—Laura B Rosenberg
(74) *Attorney, Agent, or Firm*—Crowell & Moring LLP

(57) ABSTRACT

The invention relates to a method for actuating a reversible belt pretensioner for pretensioning a belt webbing, wound around a belt reel, of a seat belt in a motor vehicle, the belt pretensioner having a drive which acts on the belt reel. The seat belt has a locking device, acting on the belt reel in the unwinding direction, as a belt extraction lock. After the triggering of the belt pretensioner and when a predefinable condition is met, the belt pretensioner is actuated in such a way that the belt reel rotates at least to such an extent in the winding-up direction that the locking device of the belt reel opens and releases the belt webbing for unwinding.

18 Claims, 6 Drawing Sheets

U.S. PATENT DOCUMENTS

| | | | |
|---|---|---|---|
| 5,788,281 A | | 8/1998 | Yanagi et al. |
| 5,826,813 A | * | 10/1998 | Hibata ..................... 242/383.1 |
| 5,931,402 A | * | 8/1999 | Weller ..................... 242/383.2 |
| 6,427,935 B1 | * | 8/2002 | Fujii et al. ............... 242/390.9 |
| 6,447,012 B1 | * | 9/2002 | Peter et al. ................. 280/806 |
| 6,485,057 B1 | | 11/2002 | Midorikawa et al. |
| 6,499,554 B1 | | 12/2002 | Yano et al. |
| 6,530,536 B1 | * | 3/2003 | Sumiyashiki et al. .... 242/383.2 |
| 6,702,326 B1 | * | 3/2004 | Fujii ......................... 280/806 |

FOREIGN PATENT DOCUMENTS

| | | |
|---|---|---|
| EP | 0747272 | 12/1996 |
| JP | 2000038110 | 2/2000 |
| JP | 2002104135 | 4/2002 |

OTHER PUBLICATIONS

English Translation of Japanese Patent Office communication for corresponding Japanese patent application.

Search Report.

* cited by examiner

METHOD FOR ACTUATING A REVERSIBLE BELT PRETENSIONER

BACKGROUND AND SUMMARY OF THE INVENTION

This application claims the priority of International Application No. PCT/EP01/14327, filed Dec. 6, 2001, and German Patent Document No. 100 61 040.4, filed Dec. 8, 2000, the disclosures of which are both incorporated by reference herein.

The present invention relates to a method for actuating a reversible belt pretensioner.

Seat belts which are nowadays usually installed in motor vehicles have a mechanism for automatically winding the loose belt webbing on to a belt winding-on roller which is arranged on a belt reel. The automatic winding on ensures that the belt which is being worn rests loosely against the body of a vehicle occupant and is rolled up on the belt winding-on roller when the seat belt is not in use. The belt is unwound from the belt winding-on roller counter to a torque which is generated by a retraction spring and is also possible when the belt is being worn, in order to permit the vehicle occupant to make a largely free movement.

Furthermore, there is usually a belt extraction lock which, triggered by an actuation device with belt-webbing sensitive and vehicle-sensitive sensor becomes active when the belt is being unwound quickly from the belt winding-on roller, starting from a predefined acceleration of the belt winding-on roller in the unwinding direction, or starting from a predefined acceleration of the vehicle, and secures the belt winding-on roller in its position at the time so that the belt is prevented from unwinding. The locking mechanism which is provided for this purpose is composed of a locking toothing of the belt reel, and of a locking latch which is pivotably mounted and can be pivoted into the locking toothing of the belt reel by means of the actuation device. The toothings on the belt reel and the locking latch are of self-locking design, causing the extraction of the belt to be locked for as long as tensile loading is applied to the belt. If the belt is relieved of this tensile loading, the locking mechanism is returned to its inactive state. This return can be carried out magnetically, electromotively or mechanically, for example by means of a restoring spring on a pivotably mounted locking latch.

In addition, in many seat belts there is a belt pretensioner which increases the protective effect of the seat belt. The belt pretensioner has a drive with an energy store which can be actuated in order to drive a mechanical device by means of the stored energy. In the case of a pyrotechnic energy store, for example, a chemical substance is made to undergo an exothermic reaction by means of a firing element. In this reaction, a gas stream is generated which drives the mechanical device. The driven device is, or can be, mechanically connected to the belt reel, for example, by means of a clutch. Via this connection, the mechanical device exerts a torque on the belt reel. By virtue of this torque, the belt reel rotates with the belt winding-on roller arranged on it and pretensions the unwound belt webbing.

As well as the usual pyrotechnic belt pretensioners which are used nowadays in motor vehicles, it is also possible to use reversible belt pretensioners in vehicles which can be triggered repeatedly, even in rapid succession. These reversible belt pretensioners can have different drives, for example, such a belt pretensioner can be driven by an electric motor. Other reversible belt pretensioners are driven with compressed air from a pressure accumulator or by means of a stressed spring, it being possible to refill the pressure accumulator during travel mode, and for the spring to be restressed during the travel mode.

Reversible belt pretensioners which are driven in this way permit the seat belt to be pretensioned to a predefinable degree, with a predefinable speed and for a predefinable period of time. The multiple triggering capability of the reversible belt pretensioner permits it to be triggered preventatively. Preventative triggering means that the belt pretensioner is triggered in safety-critical travel situations which are detected, for example, by vehicle-movement dynamic sensors or vehicle-surroundings sensors or which are determined by means of the evaluation of the actuation of the brake pedal, of the steering angle or of a driver observation. In addition to preventative triggering, a reversible belt pretensioner can also be used for haptically warning of the driver in safety-critical situations. When there is preventative triggering of the belt pretensioner or when the belt pretensioner is triggered for warning purposes, it is desirable that after pretensioning has taken place and the normal travel mode has been safeguarded, the belt should rest loosely against the vehicle occupant again. The normal travel mode is safeguarded if the evaluation of the situation by a control unit or a hazard computer does not reveal that there is a safety-critical situation.

After reversible pretensioning of the seat belt by means of a reversible belt pretensioner it is possible that the belt extraction lock has become active owing to a belt-webbing-sensitive sensor or a vehicle-sensitive sensor. Examples of belt-webbing-sensitive sensors are a mechanical centrifugal-force sensor in the belt winding in mechanism, an electromechanical centrifugal-force sensor and an electronic belt extraction sensor which senses the extraction speed of the belt or its acceleration. In particular, a belt-webbing-sensitive sensor can respond if, after belt pretensioning, the pretensioned belt is under tensile loading. This tensile loading of the pretensioned belt is in particular dependent on the degree of the pretensioning which has previously occurred and on the sitting position of the vehicle occupant before the pretensioning. As a result of this tensile loading, the belt is unwound again from the belt winding-on roller after the torque exerted on the belt reel by the belt pretensioner drive decreases. If the unwinding of the belt webbing takes place too quickly, the belt-webbing-sensitive sensor responds and the belt extraction lock becomes active. The belt extraction lock can already become active if the belt-webbing-sensitive sensor responds owing to the winding-on operation during the pretensioning of the belt, or the vehicle-sensitive sensor responds owing to the movement of the vehicle. If the belt extraction lock is active, it is no longer possible to unwind the pretensioned belt and the freedom of movement of the vehicle occupant is greatly restricted. The belt webbing is therefore to be released again if a predefined condition is fulfilled, for example, after a predefined time or if the cause of the triggering of the belt pretensioner no longer applies or if a normal travel mode is ensured. In order to release the belt webbing again, in belt extraction locks which are customary today in motor vehicles, the locking latch is to be released from the locking toothing.

The object of the present invention is to improve the application of a reversible belt pretensioner in a motor vehicle.

In order to release the vehicle occupants from the state in which the belt is pretensioned, the locking mechanism is briefly relieved of the tensile loading which is exerted by the pretensioned belt which lies closely against the vehicle occupant. For this purpose, according to the invention, the belt pretensioner is actuated in such a way that the belt reel rotates at least so far in the belt winding-on direction that the locking mechanism is released and releases the belt webbing for unwinding. The releasing of the locking mechanism takes place by virtue of the fact that the tensile loading on the belt webbing no longer exerts any force on the locking mechanism, and that given undercut toothing there is an additional rotation of the belt reel about the undercut of the teeth. The unwinding of the pretensioned belt webbing takes place in such a way that a belt-webbing-sensitive sensor which is present does not already trigger the belt extraction lock due to the desired unwinding operation. After the opening of the locking mechanism, the vehicle occupant is in the belted-up state, with a seat belt which rests loosely against him or is non-tensioned, without the vehicle occupant himself or the driver having to act and without the protective effect of the seat belt failing to be ensured at any time.

In one advantageous development of the method, the belt pretensioner is actuated in such a way that, when the belt webbing is pretensioned and after the locking device opens, the torque of the belt pretensioner drive is not reduced suddenly but rather slowly. This takes place in such a way that the unwinding operation takes place in such a way that the belt-webbing-sensitive sensor does not respond. The slow reduction in the torque takes place, for example, in that the motor current of an electro-motive belt pretensioner is reduced slowly. As a result, the tensile stress which is present in the pretensioned belt reduces more slowly than is the case when the belt pretensioner drive is switched off quickly. The advantage of this development is that renewed triggering of the belt extraction lock by the unwinding of the belt webbing is prevented.

In one advantageous refinement of the method according to the invention, a variable which is indicative of the opening of the locking device is registered. The variable which is indicative of the opening of the locking device is continuously evaluated during the actuation of the belt pretensioner. The opening of the locking device results in a situation in which the belt pretensioner no longer brings about any pretensioning in order to release the belt. The belt pretensioner is actuated in this refinement of the method in such a way that the belt reel rotates just to such an extent in the winding-on direction that the locking device of the belt reel opens and releases the belt webbing for unwinding, and the vehicle occupant is placed in the state with the belt resting loosely against him. The advantage of this refinement is that the loading on the occupants which is caused by the further rotation of the belt winding-on reel when the belt is already pretensioned is as small as possible.

In one advantageous embodiment, the release of the locking latch from the toothing which is located on the belt reel and which is registered by means of a switch is used as a variable which is indicative of the opening of the locking device. The locking latch actuates a mechanical or electrical switch as a function of its state, or is itself part of a switch. It is possible to embody the locking latch itself as a contact switch, part of the locking latch being composed of an electrically conductive material which closes a circuit in a predefined position of the locking latch. An advantage of this embodiment is that the state of the locking latch can be monitored easily and directly.

Alternatively, the rotation of the belt reel or the rotation of an electromotive belt pretensioner drive can be used as an indicative variable. By means of the signal of an angle-of-rotation sensor, the angle of rotation of the belt reel or the angle of rotation of the electromotive drive is registered and it is possible to ensure that the rotation of the belt reel by the belt pretensioner takes place by an angle which is at least of such a magnitude that the locking latch of the locking mechanism is released from the locking toothing. An advantage of this embodiment is that controlled rotation of the belt reel through a predefined angle of rotation is made possible. In a controlled rotation of the belt reel it is possible to open the locking mechanism in such a way that the vehicle occupant experiences as little loading and as few adverse effects as possible.

In one advantageous development of the method with an electromotively operated belt pretensioner, the state of the locking mechanism is registered by the fact that the value of an electrical operating variable of the electric motor is evaluated. Examples of such an operating variable are the motor current, the voltage applied to the motor or the voltage induced by the motor. If the locking mechanism is effective and the belt pretensioned, the motor current and motor voltage exhibit a different characteristic than when the locking mechanism is released with a loose belt, because, in the first case, the motor must work counter to an existing high torque. The advantage of this development of the method is that no additional sensor such as an angle-of-rotation sensor or a sensor for the position of the locking latch is necessary.

In one advantageous development of the invention with a drive for a seat adjustment means, the latter is actuated in order to open the locking device. A drive for a seat adjustment means can have, for example, an electrical or pneumatic power supply, and the drive is actuated via the control of the power supply or the supplied air pressure. If the belt extraction lock is active after belt pretensioning has occurred, the tensile force in the belt may, depending on the degree of belt pretensioning, be such that further pretensioning of the belt webbing by the belt pretensioner drive does not lead to a rotation with a sufficiently large angle of rotation, and the locking mechanism is not released. By actuating a seat adjustment means, the sitting position can be changed to the extent that the tensile force in the belt is reduced and that the subsequent pretensioning of the belt webbing by the belt pretensioner drive leads to a sufficiently large angle of rotation of the belt reel and to opening of the locking mechanism. In particular, lowering of the sitting area, displacement of the seat to the rear and inclination of the seat backrest to the rear cause the belt webbing to be relieved of tensioning. So that the vehicle occupants are adversely affected as little as possible, there may be provision for the adjustment facilities of the seat to be actuated only if the opening of the locking device according to one of the methods as described in the previous paragraphs was unsuccessful.

As an alternative to the adjustment of the seat, an electrically or pneumatically driven adjustment device of the belt deflection roller, which is provided for adjusting the height of the belt, can also be actuated in such a way that this belt deflection roller is lowered in order to open the locking mechanism. An advantage of this alternative embodiment is that the adverse effects on the vehicle occupants which occur due to actuation of the adjustment device of the belt deflection roller are reduced in comparison with the adverse effects which occur when the seat adjustment device is actuated. The actuation of the adjustment device of the belt deflection roller can also always take place in addition to an actuation, or immediately before an actuation according to the invention of the belt pretensioner drive, with the objective of reducing the loading on the vehicle occupants.

As the setting operations of the seat adjustment means and of the belt deflection roller are normally performed in such a way that in the case of small vehicle occupants the belt deflection roller is located further down and the seat further to the front, and in the case of large vehicle occupants the deflection roller is located further up and the seat further back, the pretensioned and locked belt webbing can always be relieved of loading by a combination of actuation of the belt deflection roller and actuation of the seat adjustment means. An advantage of this development is that even in the case of pretensioning with a high pretensioning force, the locking device can be reliably opened without the drive of the belt pretensioner being configured in such a way that it has a torque reserve which is provided only for opening the locking device, but not for the actual pretensioning operation.

It is also possible to actuate the belt deflection roller and the seat adjustment means either individually or in combination in order to release the locking mechanism, without the belt pretensioner drive being actuated. This has the advantage that it is not necessary to provide a belt pretensioner which permits the locking device to be opened in accordance with the method according to the invention.

BRIEF DESCRIPTION OF THE DRAWINGS

There are then various possible ways of advantageously configuring the teaching of the present invention. One advantageous embodiment of the method according to the invention will be described in more detail below with reference to the drawings, in which, in each case in a schematic view.

DETAILED DESCRIPTION OF THE DRAWINGS

Figure 1:
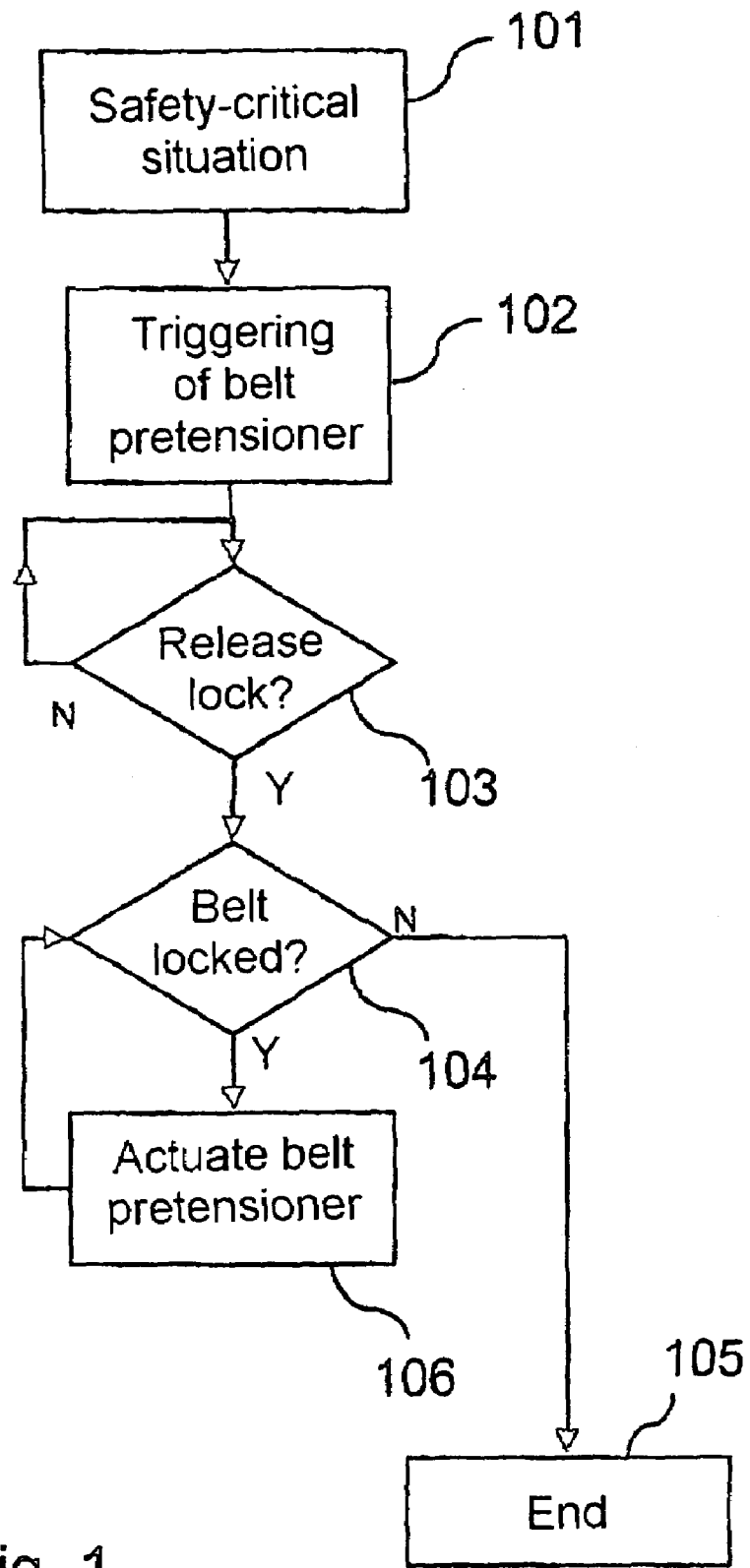
FIG. 1 shows a flowchart of the method according to the invention for actuating a reversible belt pretensioner.

FIG. 1 shows a flowchart of the method according to the invention for actuating a reversible belt pretensioner. In step 101, a safety-critical situation is detected by the hazard computer or by a control unit, for example, by the BAS (Brake Booster) control unit, by the DTR (DisTRonic=cruise controller for maintaining distance between vehicles) control unit or by the ESP (Electronic Stability Program) control unit, and as a result in step 102 the triggering of the belt pretensioner is brought about. After the belt pretensioner has been triggered in step 102 and after the belt pretensioning operation is terminated, in step 103 it is tested whether a predefined condition, which is intended to cause the belt extraction lock to be released, is fulfilled. Such a condition can be logically linked with the interrogation of a control unit or of a hazard computer. For example, it is possible to interrogate whether the safety-critical situation which is the cause of the triggering of the belt pretensioner no longer applies. In step 103 it is also possible to interrogate a simple time criterion, for example whether a predefined time period has been exceeded.

The detection of a safety-critical situation in step 101 is carried out by means of a brake booster control unit, for example by reference to the speed with which the brake pedal is actuated. Starting from a predefined actuation speed, it is concluded that there is a hazard situation and an actuation signal for full braking is output. This actuation signal for full braking is also used as a triggering signal for triggering the belt pretensioner. If it is detected by the brake booster control unit that the safety-critical situation—that is to say the situation which is the cause of the triggering of the belt pretensioner—no longer applies, for example because it is registered that the brake pedal is released, the actuation signal for the full braking is no longer output and the full braking is terminated. The disappearance of this actuation signal leads in the method according to the invention to the branching to step 104, or alternatively directly to the branching to step 106 and to the actuation of the belt pretensioner in order to release the locking device (locking mechanism, formed for example from the locking latch and complementary toothing on the belt reel). Instead of the brake booster system, the triggering signal for the belt pretensioner can also be an actuation signal for a vehicle-movement dynamics intervention which is output by a vehicle-movement dynamics control system.

In a further alternative refinement, in step 103 a waiting time $T_0$ is predefined as a predefinable condition for the actuation of the belt pretensioner in order to release the locking device, the system waiting for the waiting time $T_0$ after the disappearance of the actuation signal for the brake booster system or the vehicle-movement dynamics control system before the belt pretensioner is actuated in step 106 in order to release the locking device, or before the interrogation is carried out in step 104. The waiting time $T_0$ has the effect that the actuation of the belt pretensioner in order to release the locking device does not take place until the vehicle has reached a state in which the vehicle-sensitive sensor of the belt extraction lock does not activate the belt extraction lock. For example, after full braking, which takes place up to the stationary state of the vehicle, the vehicle still oscillates after its stationary state for a short time (at max. for approximately 1 s), during which oscillations accelerations can still occur at the vehicle which cause the vehicle-sensitive sensor, which responds if there is an acceleration of approximately 0.3 g–0.5 g, to prevent the release of the locking device or to activate the locking device again. The waiting time $T_0$ has the effect that the actuation of the belt pretensioner in order to open the locking device occurs only if the locking device can also be opened, that is to say only if the vehicle-sensitive sensor does not respond. The waiting time $T_0$ may be a function which depends on one or more parameters, for example a brake booster signal, a brake control signal, a longitudinal or transverse acceleration, the velocity of the vehicle or the steering angle.

If the condition in step 103 is fulfilled, in step 104 it is checked whether the locking mechanism of the belt reel is active. If the locking mechanism is not active, that is to say the belt is not locked and the vehicle occupant can move freely, as before the safety-critical situation, within the scope of the unwindable belt, the method is terminated in step 105.

If the result of the interrogation in step 104 is that the locking mechanism is active and the belt is locked, in step 106 the belt pretensioner is actuated again for a predefined time in order to rotate the belt reel through an angle in the winding-on direction, and thus release the locking latch of the locking mechanism. Here, the vehicle occupants, in particular the driver, should not be irritated or loaded by the further pretensioning of the belt which takes place in order to release the locking mechanism. For this reason, the actuation of the belt pretensioner in step 106 takes place, in comparison with the belt pretensioning in step 102, to a changed degree and/or the time profile of the belt pretensioning is suitably changed. Renewed engaging of the locking latch in the locking toothing can be prevented by virtue of the fact that the pretensioned belt is released of the loading by the effective tensile force by unwinding a portion of the belt webbing from the belt winding-on roller by means of a predefined switch-off characteristic of the belt pretensioner drive. This switch-off characteristic must be predefined in such a way that the belt webbing is unwound in such a way that the belt-webbing-sensitive sensor is prevented from responding. If an angle-of-rotation sensor is present on the belt reel or on an electromotive belt pretensioner drive, it can be used to monitor the unwinding of the belt webbing and to adapt the switching-off characteristic.

The method according to the invention for using a belt pretensioner is carried out in such a way that it can be aborted at any time. A triggering event for the aborting of the method is, for example, the opening of the belt buckle. This prevents the belt from being retracted, and the vehicle occupant thus experiences adverse effects, when, or after, the belt buckle is opened. If a safety-critical situation is detected again by a control unit or by a hazard computer during the execution of the method, and the ongoing method is in step 103 or a later step, the method is also aborted. It is possible to start again immediately with step 101 and, if appropriate, belt pretensioning can be triggered in step 102. This ensures an uninterrupted protective effect of the belt system.

In one of the alternative refinements of the method it is possible to interchange the steps 103 and 104, so that it is firstly determined whether the belt extraction lock is active. The condition which must be fulfilled for the opening of the lock is then interrogated. It is also possible to perform the two interrogations 103 and 104 in parallel.

In one simplified refinement of the method it is also possible to dispense with the interrogation of a condition in order to release the belt extraction lock in step 103.

Figure 2:
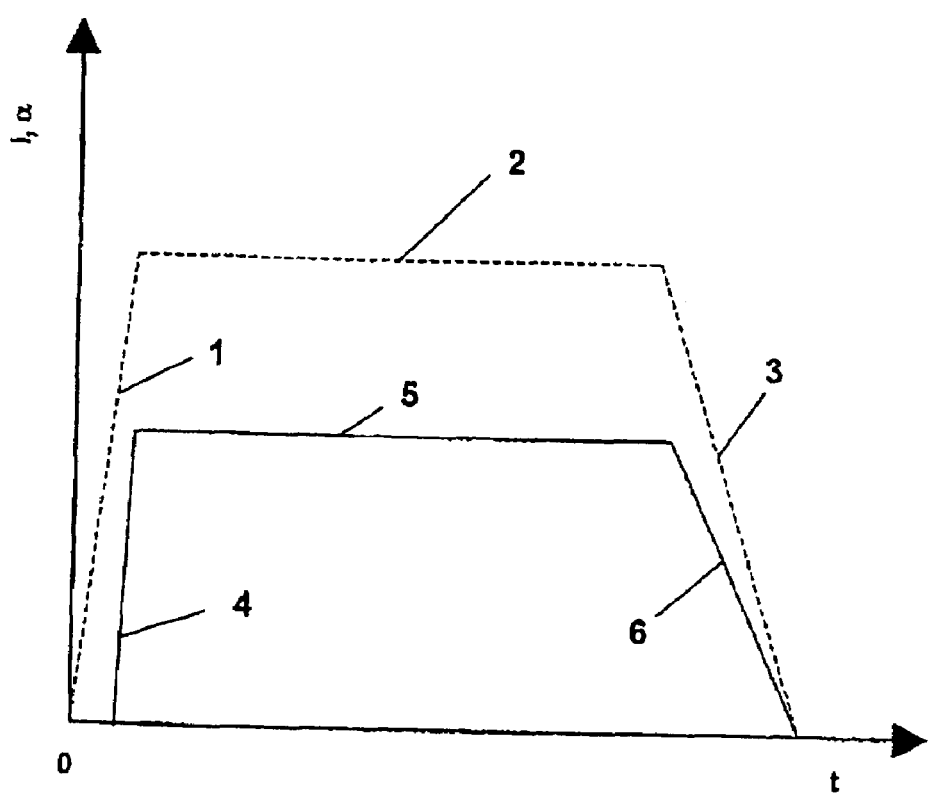
FIG. 2 shows a simple illustration of the time profile of the motor current (dashed line) of an electromotive belt pretensioner and of the time profile of the angle of rotation (unbroken line) of the belt winding-on reel during a pretensioning operation.

FIG. 2 shows a simple view of the time profile of the motor current I of an electromotive belt pretensioner and of the time profile of the angle α of rotation of the belt winding-on reel during a pretensioning operation. The motor current I is plotted on the ordinate in the form of a dashed curve, and the angle α of rotation is plotted against time t in the form of a continuous curve. After the triggering of the electromotive belt pretensioner at t=0, the motor current rises (curve section 1). When a sufficiently large torque is reached, the motor and the belt reel coupled mechanically to it begin to rotate (curve section 4) until the belt is tensioned to such an extent that an equilibrium is established between the torque of the motor and the torque of the belt winding-on roller which is acting counter to it. Starting from the time of the equilibrium of the moments, the angle of rotation of the motor and the motor current remain constant (curve sections 5 and 2). After a predefined time, or after it has been detected that the locking device has released, the power supply of the motor is reduced and the motor current drops to zero (curve section 3). At the same time, the belt is relieved of loading, and in the event of the belt extraction lock being inactive, the motor is rotated back again (curve section 6). Backward rotation of the belt pretensioner motor can be prevented if a clutch is provided between the belt pretensioner motor and the belt reel. For this purpose, a clutch which can be actuated is actuated in such a way that the belt reel is rotated back, decoupled from the belt pretensioner motor. It is also possible to use a clutch which automatically disconnects the belt pretensioner motor from the belt reel if the motor does not generate any torque in the winding-on direction. A further type of clutch releases the frictional engagement between the drive and belt reel by actuating the drive briefly in the unwinding direction, that is to say counter to its actual working direction.

In the illustration in FIG. 2, the fluctuations which occur in the motor current are not taken into account. If the fluctuations in the motor current are so large that the angle of rotation of the belt reel changes, the motor current is to be readjusted.

Figure 3:
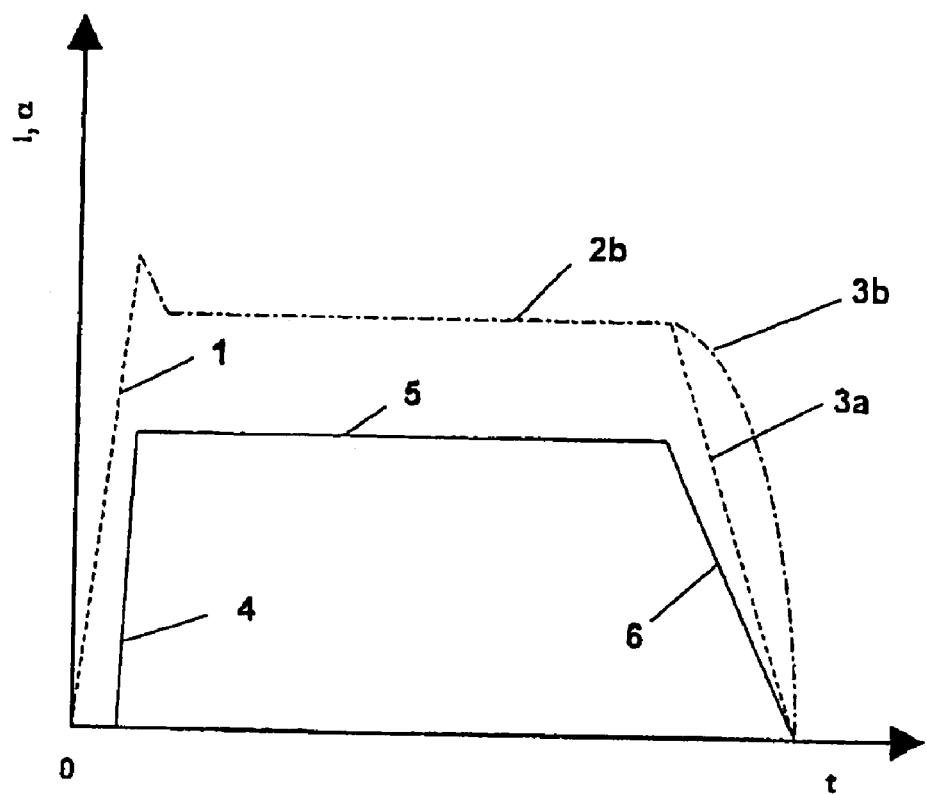
FIG. 3 shows a view of another time profile of the motor current (dashed and dot-dashed line) of an electromotive belt pretensioner and of the time profile of the angle of rotation (unbroken line) of the belt winding-on reel during a pretensioning operation.

FIG. 3 shows a further illustration of the time profile of the motor current I of an electromotive belt pretensioner and of the time profile of the angle α of rotation of the belt winding-on reel during a pretensioning operation. The motor current I is plotted against time t in the form of a dashed curve and a dot-dashed curve. After the release of the electromotive belt pretensioner at t=0, the motor current rises (curve section 1). When a sufficiently large torque is reached, the motor and the belt reel which is mechanically coupled thereto begin to rotate (curve section 4) until the belt is tensioned to such an extent that an equilibrium is established between the torque of the motor and the torque of the belt winding-on roller which counteracts it. In order to keep the motor and the belt reel in the position reached, the motor current can be reduced somewhat and held at the reduced level (curve section 2b), as part of the torque which is generated in the winding-on direction is necessary to overcome the frictional forces which occur for example on the belt deflection roller. Such a characteristic occurs in particular if the current is regulated as a function of the angular position of the motor or as a function of the angular position of the belt reel. After a predefined time or after it has been detected that the locking device has released, the power supply of the motor is reduced (curve sections 3a and 3b).

The reduction of the motor current can have a linear characteristic (curve section 3a) or a non-linear characteristic (curve section 3b), and must take place in such a way that the unwinding of the belt webbing from the belt winding-on roller does not lead to the belt extraction lock being triggered by the belt-webbing-sensitive sensor. A flatter drop in the current at the start of the unwinding operation and a steeper drop at its end are particularly suitable for this (curve section 3b). The backward rotation of the motor (curve section 6) occurs as a result of the unwinding of the belt webbing from the belt winding-on roller as a function of the current profile (curve sections 3a and 3b) and is given here in a linear form by way of example.

Figure 4:
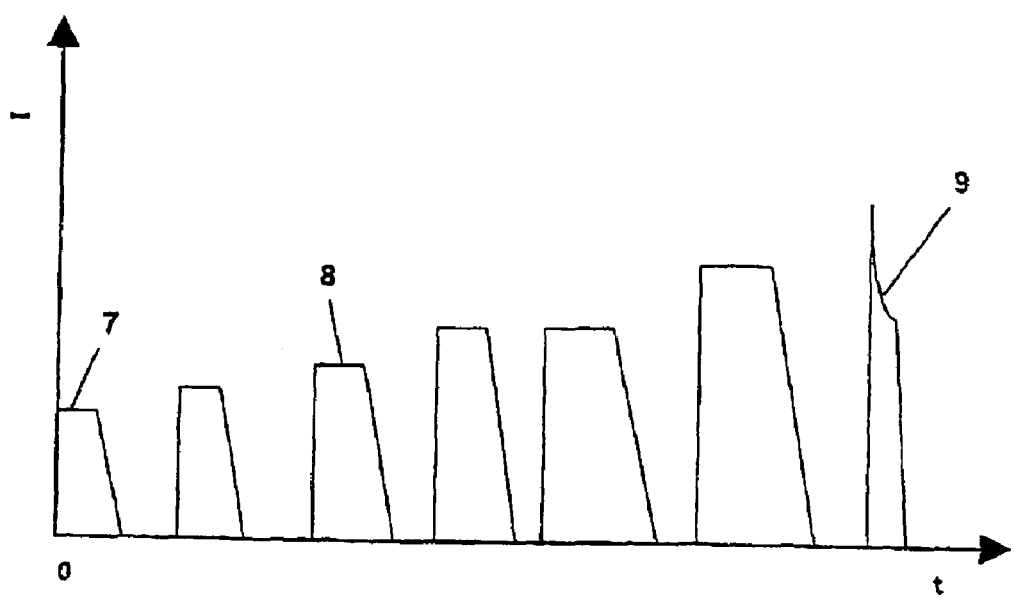
FIG. 4 shows an illustration of the time profile of the motor current in an advantageous development of the method.

The current, angle and time conditions in FIGS. 3 and 4 are represented in idealized form and are not quantitatively adapted to the actual profiles.

FIG. 4 shows an illustration of the time profile of the motor current in an advantageous development of the method. In this development of the method, conclusive information on the state of the locking mechanism is derived from the time profile of the motor current I. The motor is actuated in such a way that a series of brief pulse-like actuations 7, 8, 9 of the belt pretensioner motor are carried out in succession, in which case, each time actuation occurs, the belt pretensioner motor generates a torque which acts on the belt reel in such a way that the belt winding-on roller generates a tensile force in the unwound part of the belt webbing. The current strength I of the actuations 7, 8, 9 is increased iteratively at each actuation, the time profile of the current strength I being registered during each actuation. Alternatively, even with a constant current strength I, the duration of the pulse-like actuations can be increased iteratively, or both the current strength I and the duration of the actuations are increased. If the belt is pretensioned and the belt extraction lock is active, the torque which is generated by the belt pretensioner motor brings about an extremely small degree of winding on of the belt webbing on to the belt winding-on roller. During the small degree of winding-on, only a very small rotation of the belt pretensioner motor occurs. This has the effect that after a rapid rise the current strength I has a virtually constant profile 7 and 8 as in region 2 in FIG. 2. If the belt reel is rotated by such an actuation of the belt pretensioner motor to such an extent that the locking latch can disengage from the locking toothing, part of the wound-on belt webbing is unrolled and there is no longer any torque acting on the belt winding-on roller. If, given a renewed actuation of the belt pretensioner motor, a torque is generated at the belt reel in the winding-on direction, the belt reel can rotate very quickly and the current profile exhibits a steeply dropping edge 9. If such a steeply dropping edge 9 of the current strength I occurs during an actuation, the actuation is aborted and the method is terminated as the belt extraction lock is then no longer active. As a result of this development of the method, it is achieved that the reversible belt pretensioner motor rotates the belt reel iteratively in a rising fashion, by an angle which is just of such a magnitude that is at least necessary for the locking latch to disengage from the toothing of the belt reel and release the belt webbing. The rise in current and drop in current are controlled again in such a way that the belt extraction lock is not triggered by the belt-webbing-sensitive sensor.

The descriptions in FIGS. 2, 3 and 4 relate to an embodiment of the method with a reversible belt pretensioner having an electro motive drive. The actuation of the belt pretensioner drive which is described here can be also transferred to a pneumatic or a hydraulic, and to a certain extent to a spring-force operated belt pretensioner. Here, for example in the case of a pneumatic drive, the electric current is to be replaced in the descriptions of the figures by the air pressure.

Figure 5:
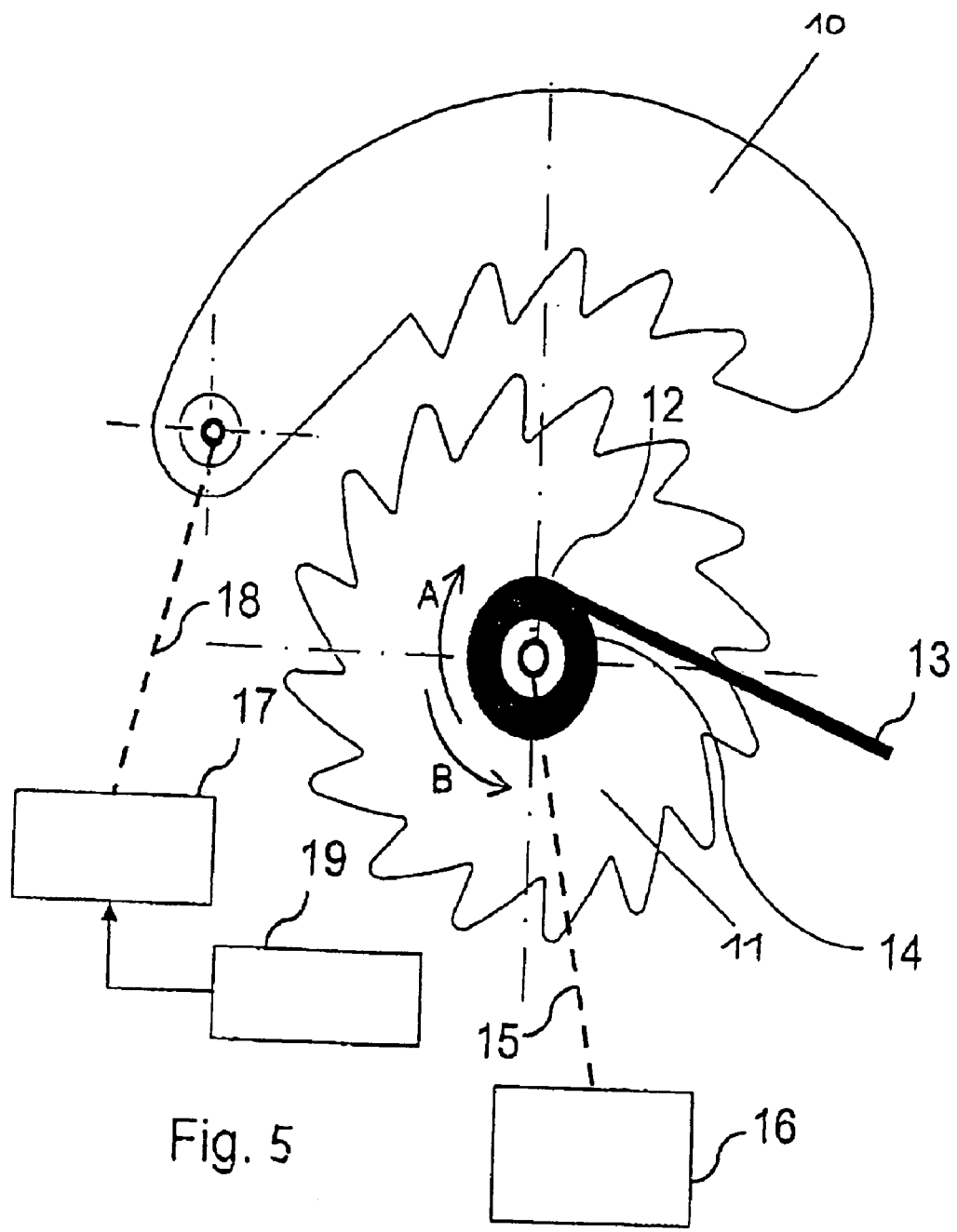
FIG. 5 shows a locking latch and a locking toothing of the belt reel when the belt extraction lock is not active.

FIG. 5 shows a rotatably attached locking latch 10 and a locking toothing 11 when the belt extraction lock is not active. The locking toothing 11 is arranged in a mechanically rigid fashion on a belt reel 12. The locking latch 10 is released by the locking toothing 11, as a result of which the belt reel 12 is freely rotatable and the belt webbing 13 can be unwound from the belt winding-on roller 14 in the unwinding direction A counter to the torque of the restoring spring. In the normal operating mode of the vehicle, this is the customary position of the locking latch 10 into which it is moved, for example by a spring mechanism or a magnet. The belt reel 12 has a mechanical connection 15 to a belt pretensioner drive 16 which rotates the belt reel 12 in the winding-on direction B. The locking latch is actuated by an actuation device 17 which has a mechanical connection 18 to the locking latch 10. The signal of a sensor 19 is conducted to the actuation device 17 and triggers there, if appropriate, the actuation of the locking latch 10. The sensor 19 can be, for example, a belt-webbing-sensitive centrifugal-force sensor, a sensor for detecting a hazard situation, such as for example a vehicle-movement dynamics sensor, or a sensor for detecting an accident situation, such as for example an acceleration sensor.

Figure 6:
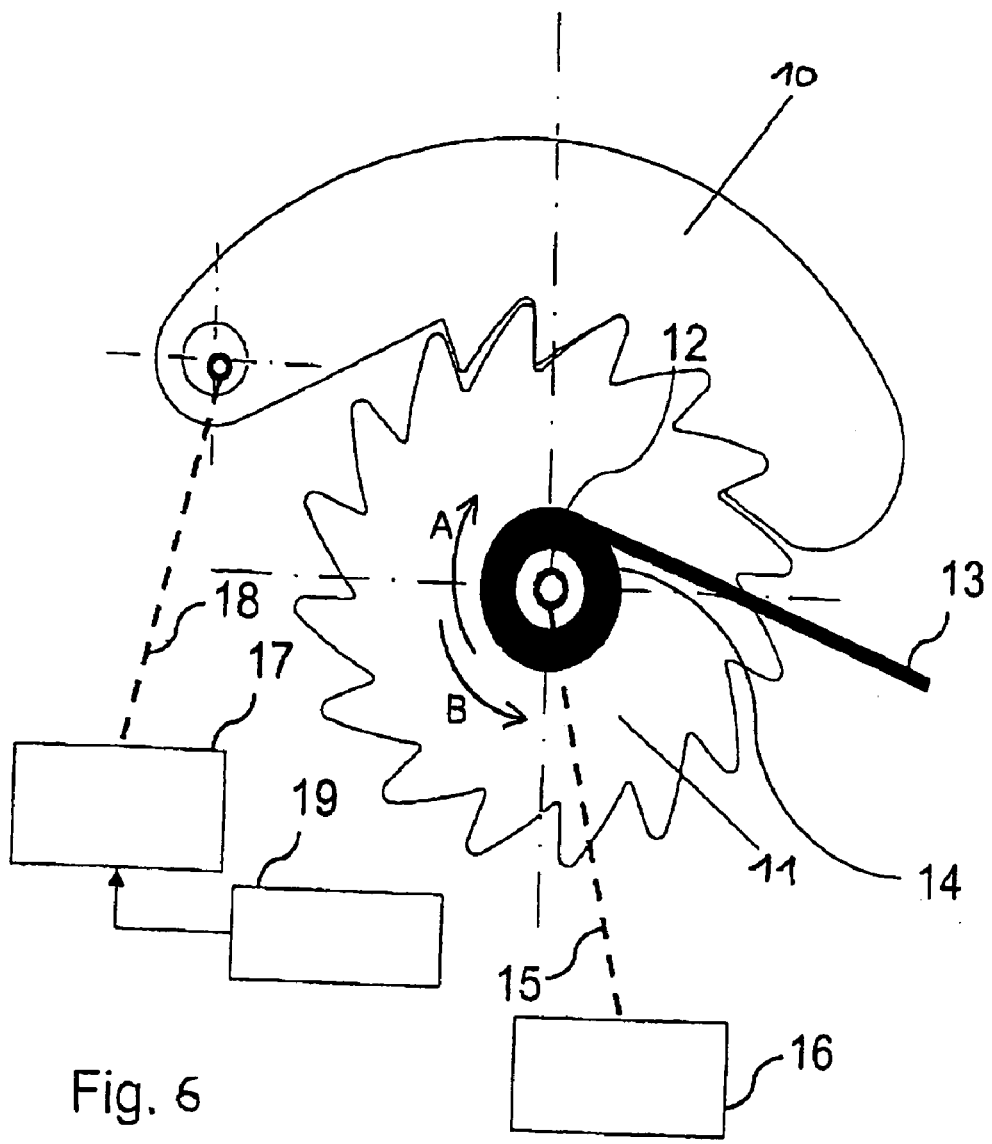
FIG. 6 shows a locking latch and a locking toothing of the belt reel when the belt extraction lock is active.

FIG. 6 shows a rotatably attached locking latch 10 and a locking toothing 11 of the belt reel 12 when the belt extraction lock is active. The locking latch 10 is moved into the position illustrated if the signal of a sensor 19 brings about the actuation of a locking mechanism by means of the actuation device 17. Because of the undercut of the toothings on the locking latch 10 and the locking toothing 11, automatic release of the locking latch 10 from the locking toothing 11 is not possible as long as the belt reel 12 with the locking toothing 11 is under the effect of a torque in the belt unwinding direction A. Such a torque is caused by the tensile force in the belt webbing 13.

The execution of the method according to the invention is described for the case of a currently customary locking mechanism of the belt extraction lock, in which mechanism a locking latch interacts with a complementary toothing on the belt reel. This illustration of the locking mechanism is selected by way of example. The method can also be executed if the locking mechanism of the belt extraction lock is of a completely different design, for example if it does not have any toothing elements which engage with one another but is rather composed of a spigot which can be actuated mechanically or electromagnetically and which engages in a predetermined location and as a result activates the belt extraction lock. The belt extraction lock can be composed of an internal locking latch with external toothing and a complementary internal toothing which is permanently connected to the belt reel.

If, in addition to the one reversible belt pretensioner which acts on the belt reel, a further belt pretensioner which, for example, is triggered pyrotechnically is additionally provided in the vehicle, the method can be executed in the form described irrespective of this further belt pretensioner, and this further belt pretensioner can also be active at a location other than the belt reel, for example on the belt buckle.

If a belt pretensioner is provided which does not act on the belt reel but rather, for example, moves the belt buckle in order to pretension the belt, a drive device which acts on the belt reel is necessary for the inventive execution of the method. This drive device is also to be referred to as a belt pretensioner. Such a belt pretensioner which acts on the belt reel can also be provided solely for opening the locking device of the belt extraction lock.

The invention claimed is:

1. A method for actuating a reversible belt pretensioner for pretensioning a belt webbing wound around a belt reel of a seat belt in a motor vehicle, the belt pretensioner having a drive which acts on the belt reel and the seat belt having, as a belt extraction lock, a locking device which acts on the belt reel in an unwinding direction and is released only if the belt reel is turned about an angular element in a winding-on direction, comprising the steps of:
   triggering the belt pretensioner;
   satisfying a pre-defined condition;
   actuating the belt pretensioner after the triggering and satisfying steps such that the belt reel turns
   at least so far in the winding-on direction that the locking device of the belt reel opens and releases the belt webbing for unwinding;
   wherein a variable which is indicative of the opening of the locking device is registered and wherein the belt pretensioner is actuated in such a way that the belt reel rotates just to such an extent that the locking device of the belt reel opens and releases the belt webbing for unwinding.

2. The method according to claim 1, wherein the locking device of the belt reel has a rotatably attached locking latch with a toothing which interacts with a complementary toothing on the belt reel, the two toothings engaging in one another when the locking device is active.

3. The method according to claim 2, wherein the opening of the locking device, through a release of the locking latch from the toothing located on the belt reel, is registered by a switch.

4. The method according to claim 1, wherein an angle of rotation of the belt reel is registered by an angle-of-rotation sensor and wherein the angle of rotation is used to determine the opening of the locking device.

5. The method according to claim 1, wherein the belt pretensioner has an electromotive drive and wherein a value of an electrical operating variable of the electromotive drive is registered during the actuation of the belt pretensioner and further wherein the value is used to determine whether the locking device is active.

6. The method according to claim 1, wherein the belt pretensioner has an electromotive drive and wherein an angle of rotation of the electromotive drive is registered and further wherein the belt pretensioner is actuated in such a way that a torque of the drive is increased until a predefined angle of rotation is reached.

7. The method according to claim 1, wherein the belt pretensioner is actuated in such a way that when the belt webbing is pretensioned and after the locking device is opened, the belt webbing is unwound from the belt reel in such a way that a belt-webbing-sensitive sensor does not bring about a triggering of the locking device.

8. The method according to claim 1, further comprising a drive for a seat adjustment mechanism, and wherein the seat adjustment mechanism is actuated in such a way that the locking device can be opened by the belt pretensioner drive.

9. The method according to claim 1, further comprising a drive for an adjustment device of a belt deflection roller and wherein the adjustment device is actuated in such a way that the locking device can be opened by the belt pretensioner drive.

10. The method according to claim 1, wherein a disappearance of a signal which brings about the triggering of the belt pretensioner is predefined as a predefinable condition for the actuation of the belt pretensioner in order to open the locking device.

11. The method according to claim 1, wherein a disappearance of an actuation signal for a brake booster system or a vehicle-movement dynamics control system is predefined as a predefinable condition for the actuation of the belt pretensioner in order to open the locking device.

12. The method according to claim 1, wherein a waiting time $T_0$ after a disappearance of a signal which brings about the triggering of the belt pretensioner is predefined as a predefinable condition of the actuation of the belt pretensioner in order to open the locking device, and wherein after an expiry of the waiting time $T_0$ the belt pretensioner is actuated in order to open the locking device.

13. The method according to claim 1, wherein when the belt pretensioner is actuated in order to open the locking device, a regulation of a motor current in order to hold the belt reel in a predefinable position is carried out until a detection that the locking device has opened.

14. A method for actuating a reversible belt pretensioner for pretensioning a belt webbing wound around a belt reel of a seat belt in a motor vehicle, the belt pretensioner having a drive which acts on the belt reel and the seat belt having, as a belt extraction lock, a locking device which acts on the belt reel in an unwinding direction and is released only if the belt reel is turned about an angular element in a winding-on direction, comprising the steps of:
   triggering the belt pretensioner;
   satisfying a pre-defined condition;
   actuating the belt pretensioner after the triggering and satisfying steps such that the belt reel turns an amount in the winding-on direction; and
   opening the locking device of the belt reel in response to the actuating step to release the belt webbing for unwinding;
   wherein an angle of rotation of the belt reel is registered by an angle-of-rotation sensor and wherein the angle of rotation is used to determine the opening of the locking device.

15. A method for actuating a reversible belt pretensioner for pretensioning a belt webbing wound around a belt reel of a seat belt in a motor vehicle, the belt pretensioner having a drive which acts on the belt reel and the seat belt having, as a belt extraction lock, a locking device which acts on the belt reel in an unwinding direction and is released only if the belt reel is turned about an angular element in a winding-on direction, comprising the steps of:
   triggering the belt pretensioner;
   satisfying a pre-defined condition;
   actuating the belt pretensioner after the triggering and satisfying steps such that the belt reel turns an amount in the winding-on direction; and
   opening the locking device of the belt reel in response to the actuating step to release the belt webbing for unwinding;
   wherein the belt pretensioner has an electromotive drive and wherein an angle of rotation of the electromotive drive is registered and further wherein the belt pretensioner is actuated in such a way that a torque of the drive is increased until a predefined angle of rotation is reached.

16. A method for actuating a reversible belt pretensioner for pretensioning a belt webbing wound around a belt reel of a seat belt in a motor vehicle, the belt pretensioner having a drive which acts on the belt reel and the seat belt having, as a belt extraction lock, a locking device which acts on the belt reel in an unwinding direction and is released only if the belt reel is turned about an angular element in a winding-on direction, comprising the steps of:
   triggering the belt pretensioner;
   satisfying a pre-defined condition;
   actuating the belt pretensioner after the triggering and satisfying steps such that the belt reel turns an amount in the winding-on direction; and
   opening the locking device of the belt reel in response to the actuating step to release the belt webbing for unwinding;
   wherein the belt pretensioner is actuated in such a way that when the belt webbing is pretensioned and after the locking device is opened, the belt webbing is unwound from the belt reel in such a way that a belt-webbing-sensitive sensor does not bring about a triggering of the locking device.

17. A method for actuating a reversible belt pretensioner for pretensioning a belt webbing wound around a belt reel of a seat belt in a motor vehicle, the belt pretensioner having a drive which acts on the belt reel and the seat belt having, as a belt extraction lock, a locking device which acts on the belt reel in an unwinding direction and is released only if the belt reel is turned about an angular element in a winding-on direction, comprising the steps of:

triggering the belt pretensioner;

satisfying a pre-defined condition;

actuating the belt pretensioner after the triggering and satisfying steps such that the belt reel turns an amount in the winding-on direction; and opening the locking device of the belt reel in response to the actuating step to release the belt webbing for unwinding;

further comprising a drive for a seat adjustment mechanism, and wherein the seat adjustment mechanism is actuated in such a way that the locking device can be opened by the belt pretensioner drive.

18. A method for actuating a reversible belt pretensioner for pretensioning a belt webbing wound around a belt reel of a seat belt in a motor vehicle, the belt pretensioner having a drive which acts on the belt reel and the seat belt having, as a belt extraction lock, a locking device which acts on the belt reel in an unwinding direction and is released only if the belt reel is turned about an angular element in a winding-on direction, comprising the steps of:

triggering the belt pretensioner;

satisfying a pre-defined condition;

actuating the belt pretensioner after the triggering and satisfying steps such that the belt reel turns an amount in the winding-on direction; and opening the locking device of the belt reel in response to the actuating step to release the belt webbing for unwinding;

further comprising a drive for an adjustment device of a belt deflection roller and wherein the adjustment device is actuated in such a way that the locking device can be opened by the belt pretensioner drive.

* * * * *